United States Patent
Minnick

(10) Patent No.: US 10,595,087 B2
(45) Date of Patent: Mar. 17, 2020

(54) MEDIA CONTENT SKIPPING

(71) Applicant: EchoStar Technologies L.L.C., Englewood, CO (US)

(72) Inventor: Danny J Minnick, Littleton, CO (US)

(73) Assignee: DISH Technologies L.L.C., Englewood, CO (US)

(*) Notice: Subject to any disclaimer, the term of this patent is extended or adjusted under 35 U.S.C. 154(b) by 210 days.

(21) Appl. No.: 14/798,701

(22) Filed: Jul. 14, 2015

(65) Prior Publication Data
US 2017/0019444 A1    Jan. 19, 2017

(51) Int. Cl.
| | |
|---|---|
| *H04L 29/06* | (2006.01) |
| *H04N 21/466* | (2011.01) |
| *H04N 21/442* | (2011.01) |
| *H04N 21/472* | (2011.01) |
| *H04H 60/37* | (2008.01) |

(52) U.S. Cl.
CPC . *H04N 21/47217* (2013.01); *H04N 21/44204* (2013.01); *H04N 21/44222* (2013.01); *H04N 21/466* (2013.01); *H04N 21/4667* (2013.01); *H04H 60/37* (2013.01); *H04H 60/375* (2013.01)

(58) Field of Classification Search
CPC ....... H04N 21/44008; H04N 21/44222; H04N 21/25891; H04N 21/4532; H04N 21/454; H04N 21/4667; H04N 21/6582; H04N 21/44204; H04N 21/47217; H04N 21/466; H04H 60/37; H04H 60/375; H04H 60/377
See application file for complete search history.

(56) References Cited

U.S. PATENT DOCUMENTS

| | | | |
|---|---|---|---|
| 7,248,777 B2* | 7/2007 | Feininger | H04N 5/76 386/241 |
| 2002/0120925 A1* | 8/2002 | Logan | A23L 2/52 725/9 |
| 2004/0045020 A1* | 3/2004 | Witt | H04N 7/163 725/13 |
| 2005/0138674 A1* | 6/2005 | Howard | H04N 7/088 725/136 |
| 2009/0327193 A1* | 12/2009 | Eronen | G06Q 10/00 706/47 |
| 2010/0005487 A1* | 1/2010 | Tsai | H04N 7/17318 725/32 |
| 2013/0308818 A1* | 11/2013 | MacIntosh | G06T 1/0021 382/100 |
| 2014/0255004 A1* | 9/2014 | Allen | H04H 60/377 386/241 |

(Continued)

*Primary Examiner* — Gregory G Todd

(57) ABSTRACT

A first index to a media content item and a second index to the media content item are stored on a media device. Each first index specifies a location in the media content item at which user input was received to skip a portion of the media content item. Each second index specifies a location in the media content item at which user input was received to resume playback of the media content item. A skip start index for the media content item is identified based on the first indexes. A skip end index for the media content item is identified based on the second indexes. A request for playback of an instance of the media content item is received. The instance of the media content item can be played skipping a portion of the instance of the media content item between the skip start and skip end indexes.

14 Claims, 4 Drawing Sheets

(56) References Cited

U.S. PATENT DOCUMENTS

| | | | |
|---|---|---|---|
| 2015/0020086 A1* | 1/2015 | Chen | H04N 21/44218 725/12 |
| 2015/0113153 A1* | 4/2015 | Lin | H04L 65/602 709/228 |
| 2016/0014461 A1* | 1/2016 | Leech | H04N 21/4668 725/14 |
| 2016/0147767 A1* | 5/2016 | Manning | G06F 17/30053 715/716 |
| 2016/0173941 A1* | 6/2016 | Gilson | H04N 21/454 725/14 |
| 2016/0216934 A1* | 7/2016 | Guy | G06F 3/165 |
| 2017/0006252 A1* | 1/2017 | Patel | H04N 5/783 |

\* cited by examiner

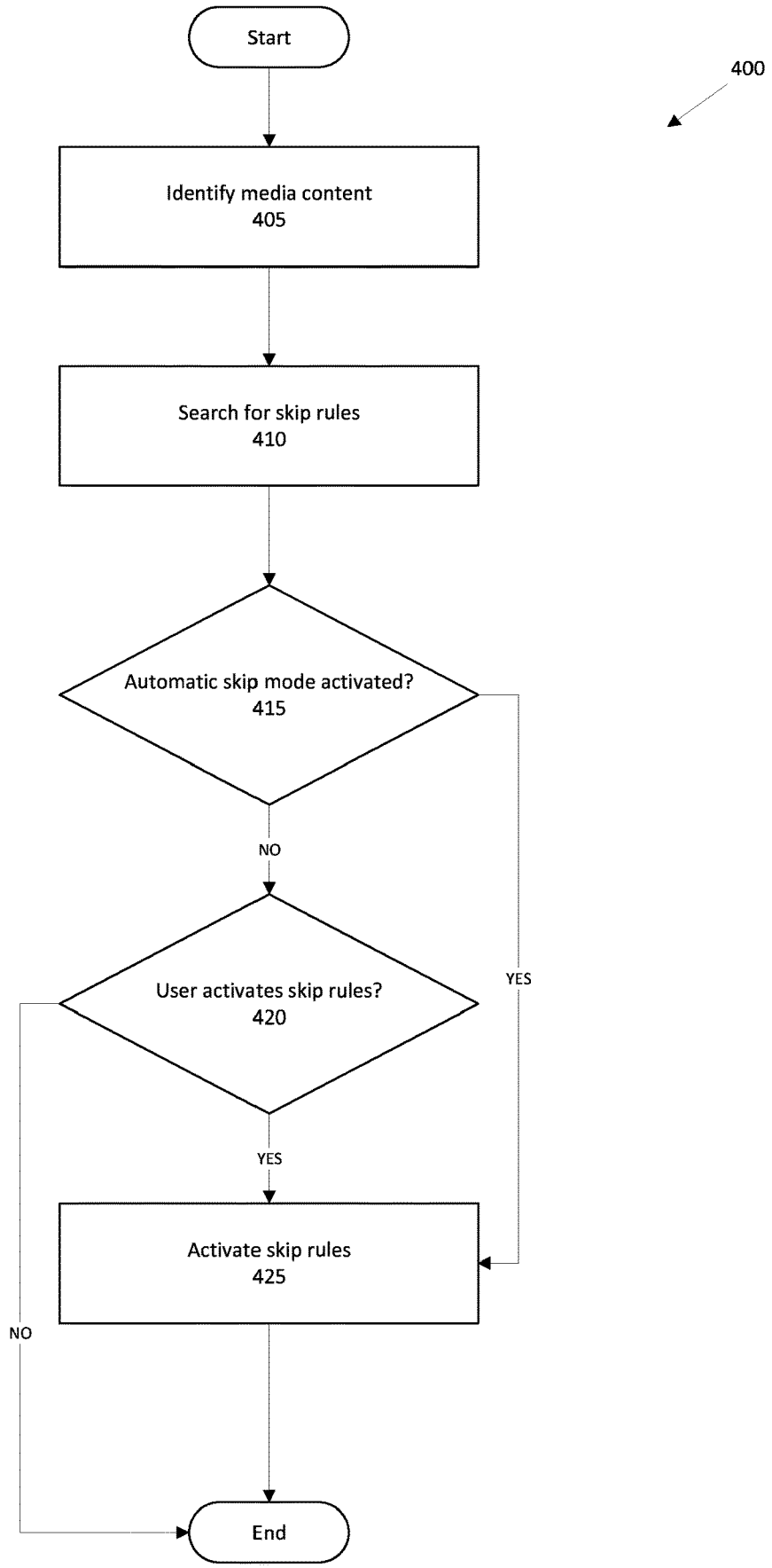

MEDIA CONTENT SKIPPING

BACKGROUND

Media content may be recorded on a media content device. Users may use a remote control or the like to selectively skip portions of the media content, e.g., commercials, opening credits, ending credits, etc.

BRIEF DESCRIPTION OF THE DRAWINGS

FIG. 4 is a block diagram of an exemplary process for implementing the skip rules of FIG. 3.

DETAILED DESCRIPTION

Introduction

Figure 1:
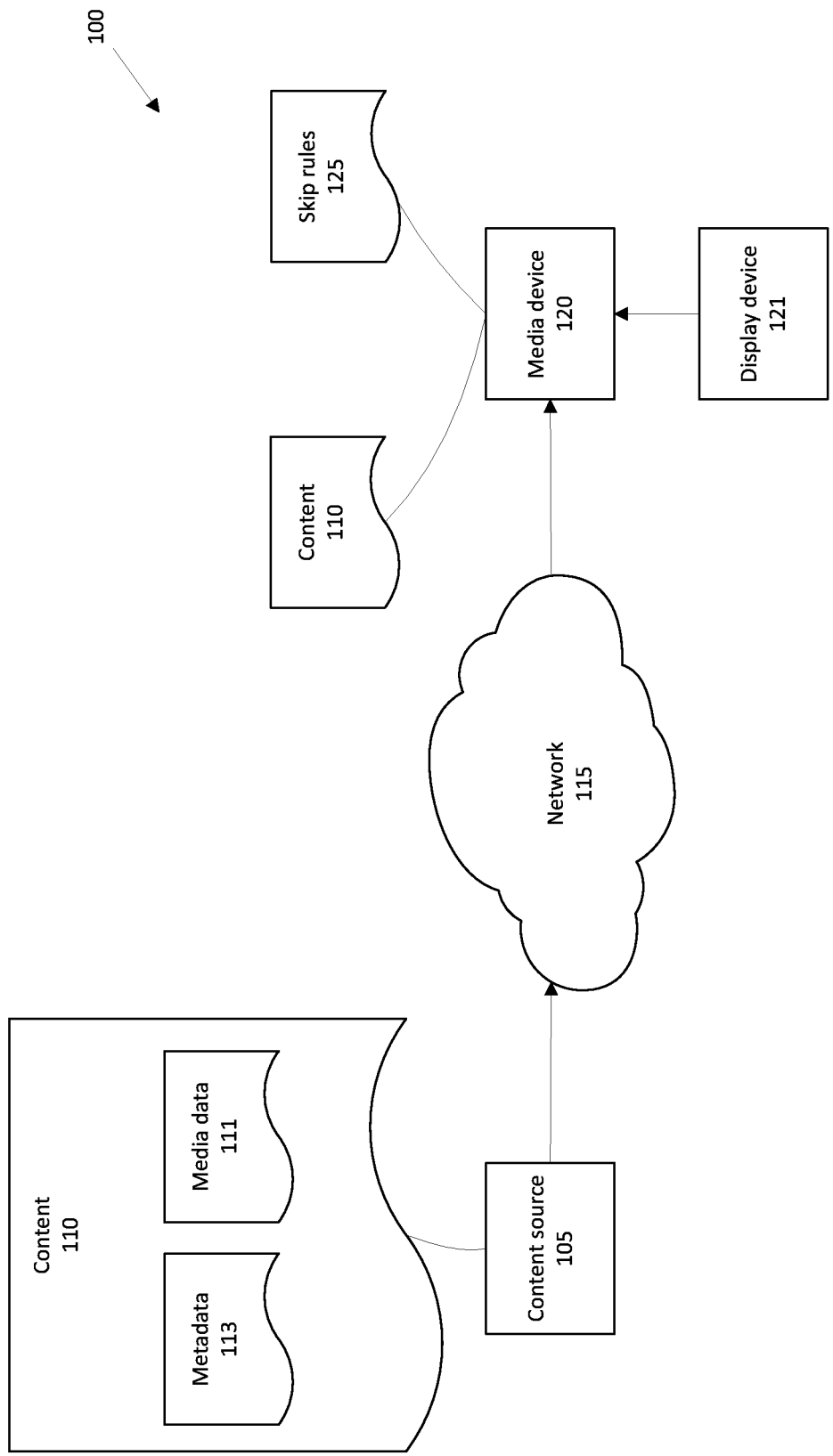
FIG. 1 is a block diagram of an exemplary media content delivery system.

FIG. 1 illustrates a media content delivery system 100. The system 100 includes a media content source 105 that provides media content 110 including media data 111 and metadata 113 to a media device 120. The media content device 120 may be a set top box or the like capable of providing operations known for a digital video recorder (DVR) or the like. During display of a media content 110 item that it has stored, the device 120 may receive user input to skip one or more portions of the media content item. The media content 110 may be an instance of a set of media content items associated with what is referred to herein as a "title," i.e., a set of media content 110 items that are periodically provided from the content course 105 on demand at/or at a regularly scheduled time, the items being related as part of a common work or presentation, e.g., as episodes of a television program.

It has been realized that user input to skip a portion of a media content 110 item that is an instance of a title may indicate a user desire to skip a same or similar portion of other media content 110 items associated with the title. Further, by accumulating data of user input to skip portions of multiple media content 110 instances of a title, the device 120 can generate, for a title, one or more of what are referred to herein as "skip rules." A skip rule specifies a portion of a stored media content 110 item associated with a title that the device 120 can cause to be skipped, i.e. omitted, when the stored media content 110 is displayed, i.e., played back, on a display device 121.

Exemplary System Elements

The media content source 105 may be any one, or some combination, of various mechanisms for delivering media content 110, and may depend on a type of media content 110 being provided. By way of example and not limitation, media content 110 data may be provided as video-on-demand through a cable, satellite or internet protocol television (IPTV) distribution system, as streaming Internet video data, or as some other kind of data. Further for example, the media content source 105 could be a computer readable medium included in or accessible by a media device 120, e.g., an optical disc such as a DVD (sometimes referred to as a digital video disk) or Blu-ray™ disc, etc. In general, examples of media content 110 include various types of data, including audio, video, images, etc. Accordingly, examples of content sources 105 may include one or more of a cable or satellite television head end, a video streaming service such as generally includes a multimedia web server (or some other computing device), or some other mechanism for delivering multimedia data.

The system 100 includes a network 115. The network 115 represents one or more mechanisms for delivering content 110 from a content source 105 to a media device 120. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Media content 110 is generally delivered via the network 115 in a digital format, e.g., as compressed audio and/or video data. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-2 or the H.264/MPEG-4 Advanced Video Coating standards (AVC) (H.264 and MPEG-4 at present being consistent), or according to some other standard or standards. For example, media content 110 could be audio data formatted according to standards such as MPEG-1 or MPEG-2 Audio Layer III (MP3), Advanced Audio Coding (AAC), etc. Further, the foregoing standards generally include support for metadata, such as the metadata 113 discussed herein. Media content 110 using a standard or standards that do not explicitly include provisions for metadata, or standards that have limitations on metadata size, may be supplemented with discrete metadata 113 (e.g. separate files) which uses either embedded metadata 113 or information such as timecodes/time stamps/timing intervals which can be used to modify the standard content 111.

Media content metadata 113 generally includes indexes, pointers, or other mechanisms for identifying locations in media content 110, e.g., a stream of standard content 111. Such location-identifying mechanisms may be used with other content metadata 113 to identify locations in standard content 111. Alternatively and/or additionally, content metadata 113 could be stored and/or provided separately to the media device 120, apart from media data 111. In general, content metadata 113 provides general descriptive information for the media content 110. Examples of content metadata 113 include information such as content title, chapter, actor information, Motion Picture Association of America MPAA rating information, reviews, and other information that describes the item of media content 110. Information for metadata 113 may be gathered from a content producer, e.g., a movie studio, media information aggregators, and other sources such as critical movie reviews. Further, content metadata 113 generally identifies a title associated with a media content 110 item, and may further provide various data such as to identify a director, producer, screenwriter, star rating, awards, critical reviews, voice-over, story slides, story text, story animations, studio animation for the movie, etc.

The system 100 includes the media device 120. The media device 120 may be any suitable device for accessing media content 105, e.g., a set-top box, and providing the content 110 to a display device 121, e.g., a television or a computer monitor, that is electronically coupled to or otherwise in communication with the media device 120. The media device 120 includes a memory storing media content 110 and skip rules 125. When content 110 is referred to herein as being "displayed" it is to be understood that such display could include any possible mode of displaying media data, such as a display of visual data, audio data, etc. For example, content 110 could be displayed by showing video or image data on a screen display 121 with or without sound, by playing audio data with or without a visual display 121, etc.

Figure 2A:
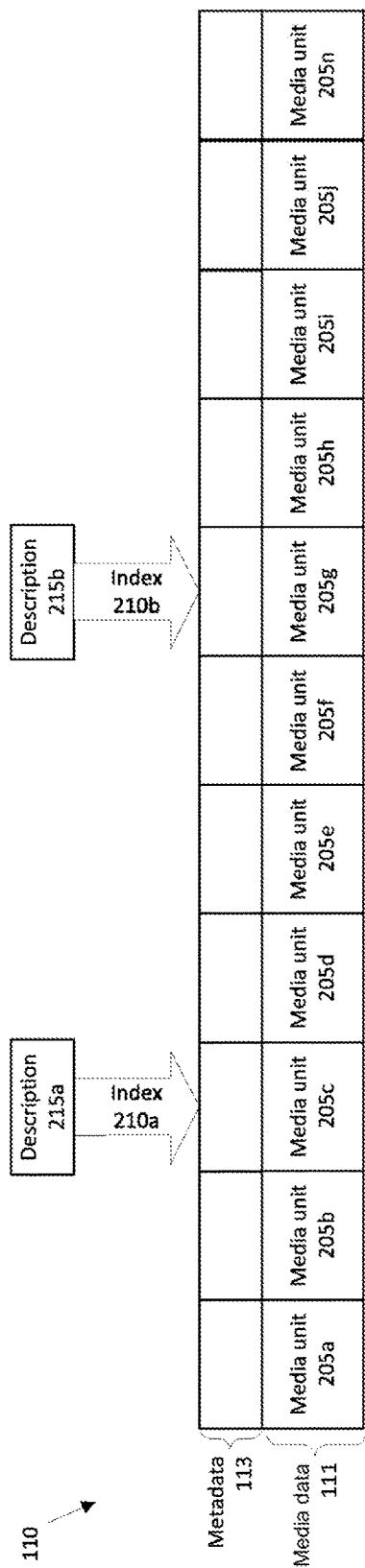
FIG. 2A is a block diagram of an exemplary media content item.

Content metadata 113 may be implemented in various ways. FIG. 2A is a block diagram of a media content 110 item that includes exemplary metadata 113 providing information about media data 111. The media data 111 may include a plurality of media units 205a . . . 205n, e.g., frames or the like in a stream of compressed media data formatted according to the MPEG standard or the like. Indexes 210 in metadata 113 specify respective locations in media data 111, e.g., specify an identifier such as a frame number or the like, a time index, etc. of a media units 205. Thus, indexes 210 specify locations in the data 111 described by metadata descriptions 215. For example, FIG. 2A shows descriptions 215a and 215b respectively associated with media units 205c and 205g by indexes 210a and 210b.

Metadata descriptions 215 generally describe attributes of a portion, e.g., selected units 205, or all of the media data 111. A description 215 could include virtually any descriptive information related to some or all of the media data 111, such as a rating (e.g., critical, e.g., 4 stars, or maturity level. e.g., PG-13), a genre (e.g., romance, slapstick, etc.), featured characters, featured actors, geographic locations, musical titles, etc. For example, descriptions 215 could include words or phrases describing an indicated portion of the standard content 111, e.g., describing a scene such as "violent," "love scene," etc. Further, a description 215 might include attributes, e.g., "begin" and "end" indicating a beginning and an end of a portion of standard media data 111 associated with an index description, e.g., "violent," "love scene," etc., and/or a beginning or end of commercial programming, etc.

Figure 2B:
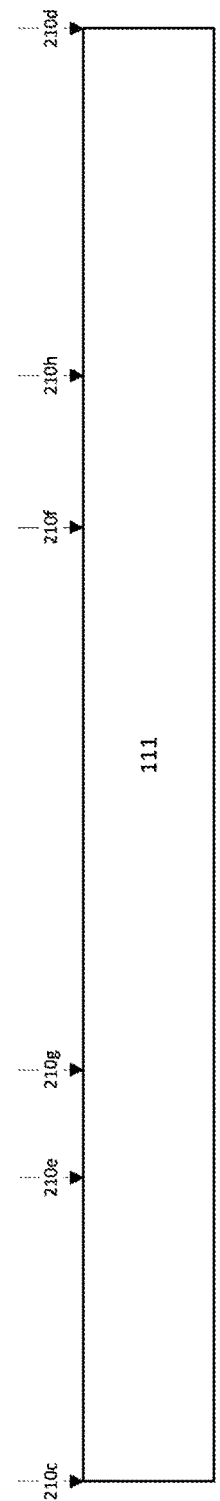
FIG. 2B is a block diagram of the media content item of FIG. 2A including a plurality of indexes.

FIG. 2B illustrates the media data 111 with a plurality of indexes 210. The index 210c indicates the start of the media content 110, and the index 210d indicates the end of the media content 110. The start 210c and the end 210d of the media content provide for skip rules, described further below, to be implemented in a manner that accounts for the fact that a scheduled item of media content, received and stored by the media device 120, may have different total play times from item to item (e.g., from episode to episode of a television program), and may not begin precisely at a scheduled deliver time (e.g., a television program scheduled to being at 8 PM central standard time may sometimes begin 90 to 120 second before or after that time).

Indexes 210e and 210f are referred to as "skip start" indexes because they indicate a location in an item of media content 110, stored in a memory of the media device 120, at which the media device 120 has received user input to perform an operation to move from a first to a second location in the media content 110 such as to skip playback, i.e., display, of the item of media content 110. e.g., to perform a "fast forward" or some other operation to skip a portion of the media content 110, to perform a "skip" of a predetermined amount of time or number of media units, e.g., frames, to "reverse" or rewind, etc. For example, such user input may be received at the beginning of a commercial, recurring opening introduction, credits, etc., in the media content 110. Skip start indexes 210, of which the indexes 210e, 210f are examples, may be stored in the media device 120, and, as described further below, may be used for generating skip rules.

"Skip end" indexes 210g, 210h specify respective locations in media data 110, following respective skip start indexes 210e, 210f, at which a user input has been received in the device 120 to resume playback of an item of media content 110. Thus, a first index 210 (e.g., skip start index 210e) and a second index 210 (e.g., skip end index 210g) can specify a skipped portion of the media content 110, e.g., a time period, set of media units 205, etc., that a user desired to skip. The skip end indexes may alternatively be predetermined according to a length of media content 210 to be skipped upon receipt of a single user input that defines both the skip start index and the skip end index. For example, the single input may be provided by a "skip" button or the like. Skip end indexes 210g, 210h, etc. may be stored in the media device 120, and, as described further below, used with skip start indexes 210 such as described above, for generating skip rules.

Figure 3:
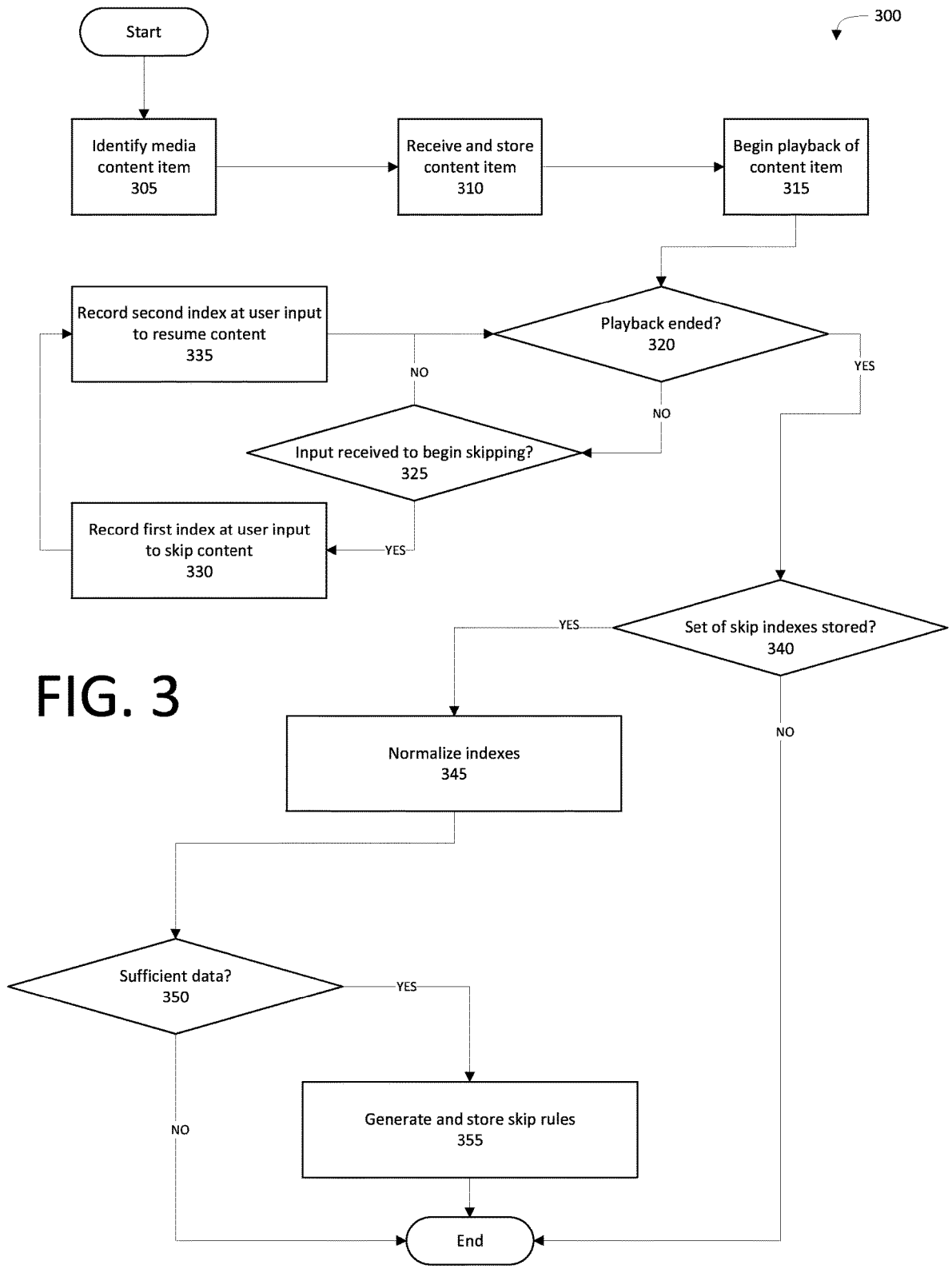
FIG. 3 is a block diagram of an exemplary process for generating skip rules for the media content item of FIG. 2B.

FIG. 3 illustrates a process 300 for generating skip rules for media content 110. The process 300 starts in a block 305, in which the media device 120 identifies a received media content item 110. The identification of the media content 110 may be included media content 110 metadata 113, and/or may be provided by the content source 105 when the media content 110 is delivered to the device 120

Next, in a block 310, the media device 120 receives and stores the media content item, e.g., on a memory or other storage medium of a digital video record (DVR) or the like, such as is known, and such as may comprise, or be included in, the device 120.

Next, in a block 315, generally upon receiving a user input specifying a request to display the received and stored media content item 110, e.g., the request specifying a title and/or specific instance, e.g., an episode, of media content 110 associated with the title, the device 120 begins playback of the stored media content item 110, generally at a start index 210.

Next, in a block 320, the media device 120 determines whether playback of the media content item has ended, e.g., whether an end index 210 has been reach, whether playback of the media content 110 has ceased, etc. If so, then the process 300 proceeds to a block 340. If not, then the process 300 proceeds to a block 325.

In the block 325, the device 120 determines whether an input is received to skip a portion of the media content 110 being displayed. The input may be, e.g., a fast-forward input, a reverse input, a skip for a predetermined time, number of media units, etc., and/or any other suitable user input to move from a first to a second location, e.g., as indicated by indexes 210, in the media content 110. If such input is received, then the process 300 proceeds to a block 330. Otherwise, the process 300 returns to the block 320. The user input may be provided via any suitable input mechanism included in or communicatively coupled to the media device 120, e.g., a remote control, a keyboard, a pointing device such as a mouse or trackpad, a smartphone, a personal tablet device, etc.

Next, in a block 330, the media device 120 stores the location in the media content 110 at which the input of the block 325 was received as a first index 210 specifying a location in the media content 110 at which the input was received during the playback of the media content item 210 to begin skipping a portion of the media content 110.

Next, in a block 335, the media device 120 receives a second user input to resume playback of the media content item 110, and stores a second index 210 indicating a location in the media content 1110 at which the second input was received. The second user input may be, e.g., a "play" input, a "stop" input, and/or a "reverse" input. The second index specifies an end of a skipped portion of the media content 110. Accordingly, following execution of the blocks 330 and 335, the media device 120 has stored at least one set of start and end indexes 210 for an item of media content 210. Each set of start and end indexes is usually stored with an identifier for the media content item 110, e.g., identifying a television program or the like of which the media content item 110 is an episode. Following the block 335, the process 300 returns to the block 320.

In the block 340, the device 120 determines whether one or more sets of skip indexes 210, i.e., one or more skip start indexes 210 and respective skip end indexes 210 specifying a portion of the media content 110 that user input has specified to be skipped during a display of the media content 110, have been stored during the display of the media content 110 commenced in the block 315. If one or more sets of skip indexes 210 have been stored, the process 300 proceeds to a block 345. If not, the process 300 ends.

In the block 345, the media device 120 normalizes start and end indexes 210 that were grouped together after being deemed to cover a same portion of each of a plurality of media content 110 items associated with a title as described above. In this context, normalizing respective indexes means assigning a same value to each of the indexes 210, e.g., a same value may be assigned to start indexes 210 deemed to designate a portion of media content 110 items, and a second same value may be assigned to end indexes 210 deemed to designate the portion of media content 110 items.

Such normalization is advisable because a recording start time, and hence start index 210, of a first media content 110 instance for a title may not align with a start of a second instance of a media content 110 item. Further, media content 110 items for a title may have different lengths, but, absent normalization of start indexes, it may be difficult to determine whether end indexes 210 being different from one another is due to different lengths or is due to different start times. Yet further, the device 120 typically begins recording for a media content item 110 before the actual start of the content 110. e.g., two to three minutes, meaning that start indexes 210 cannot be assumed to be the same for different recordings of different media content 110 items related to a title.

Therefore, to normalize the indexes, the media device 120 identifies media units 205 that respectively start and end the media content 110 from, e.g., metadata 113. For example, the media device 120 may count a number of media units 205 between from a start of a recording and metadata 113 indicating a start index 210. A start index for each media content 111 may be set to a same value, e.g., zero, for each media content item. All other indexes may be adjusted according to a difference between a start index value in a recording of the media content 110 item and the set value. For example, if the start index 210 was one minute and thirty seconds into a recording, and the set value was zero, then other indexes 210 in the recording would be adjusted by subtracting one minute and thirty seconds. A similar process could be performed if indexes 210 referred to media units 205. The media device then counts the number of media units 205 between the first and second indexes. The number of media units 205 from the start to the first indexes indicates when to start skipping the content 110, and the number of media units 205 between the first and second indexes indicates how long the skippable portion lasts. By normalizing the indexes, the media device 120 may properly omit the skipped portions of the media content 110 regardless of the start of recording time.

In the block 350, the media device 120 determines whether, for a related set of media content 110 items. e.g., items related according to a title such as respective episodes of a television program, the device 120 has stored sufficient first and second indexes for generation of skip rules for one or more portions of instances of media content 110 associated with the title. If not, the process 300 ends. If so, then the process 300 proceeds to a block 355.

The sufficient number of indexes 210 may be a predetermined setting in the media device 120 and/or may be an adjustable user setting. In general, set least three, and preferably five or more, sets of skip indexes, each of the sets of skip indexes generally including respective start indexes and end indexes that are deemed to cover a same portion, e.g., a same time period such as between minutes ten and eleven, of respective media content 110 items associated with a same title, may be deemed sufficient. However, this number may vary. Sets of indexes 210 are deemed to cover a same portion of respective related media content 110 items where respective start and end indexes 210 are within a specified threshold or closeness, e.g., number of seconds, number of media units 205, etc., of each other will be used to generate skip rules.

For example, the media device 120 may identify sets of indexes 210, i.e., respective start and end indexes 210, by performing an index 210 grouping operation. The grouping operation includes determining whether a predetermined number, e.g., three, five, etc., of skip start indexes 210 are within a predetermined threshold, e.g., 5 seconds, ten seconds, etc., of each other, and whether a predetermined number, e.g., three, five, etc., of end indexes 210 are within a predetermined threshold, e.g., five seconds, ten seconds, etc. These threshold(s) may be a predetermined setting of the media device 120 or may be an adjustable user setting. The threshold typically should be large enough to account for variations indexes 210 due to variations in timing of user input. As stated above, if the foregoing determination is negative, then the process 300 ends after the block 350; otherwise, the block 355 is executed next.

Next, in a block 355, the media device 120 generates and stores a set of skip rules, and the process 300 ends. For example, a skip rule may specify a skip start index and a skip end index for display of a recording of a media content 110 item associated with a title. One or more skip rules, e.g., sets of skip start and skip end indexes 210, may be provided for a title, and used in the display of a media content 110 item associated with the title. For example, a skip rule may specify a skip start index 210 that is a number of media units 205 from a start index 210 for the media content 110 item at which display of media units 205 should be omitted. The skip rule may further specify, in a set of skip start and end indexes, a skip end index 210 that specifies a location at which display, i.e., playback, is resumed. Application of skip rules is further discussed with respect to FIG. 4.

FIG. 4 illustrates a process 400 for applying a set of skip rules, e.g., generated as described above with respect to FIG.

3, to display of a media content 110 item. The process 400 starts in a block 405, in which the media device 120 identifies the media content 110 item requested for playback according to its title. i.e., association with a group or category of media content 110 items as described above. As also explained above, the media device 120 may use the metadata 113 to identify the content 110, and/or may receive such identification from the content source 105.

Next, in a block 410, the media device 120 searches for stored skip rules, e.g., stored in a memory of the device 120.

Next, in a block 415, which may be omitted in some implementations, the media device 120 determines whether a skip mode is activated, i.e., whether skip rules are to be applied with user intervention or further user input. If the skip mode is activated, the process 400 proceeds to a block 425.

If the automatic skip mode is not activated, the process moves to a block 420. In the block 420, the media device prompts the user to activate skip rules, i.e., skip mode. If the user activates the skip rules, the process 400 moves to the block 425. If the user does not activate the skip rules, the process 400 ends.

In the block 425, the media device 120 applies the skip rules during display of the media content 110 item, omitting the media content between the first and second indexes. Specifically, the media device 120 identifies one or more sets of first and second indexes. i.e., skip start and skip end indexes, stored in one or more skip rules. When the device 120 reaches playback of a media unit 205 indicated by a skip start index, display of the media content 110 skips to a media unit 205 specified by a second index, i.e., the skip end index associated with the skip start index. Following the block 425, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   store a plurality of media content items that are each associated with a same title, each media content item having a respective start index and a respective end index;
   determine, for each of the media content items, a respective skip start index and a respective skip end index, the respective skip start index corresponding to a location in the media content item at which a first input was received by a user during prior playback of the media content item to begin skipping a portion of the media content item, and the respective skip end index corresponding to a location in the media content item at which a second input was subsequently received by the user to resume playback of the media content item;
   normalize the respective skip start indexes and the respective skip end indexes across the plurality of media content items in accordance with normalizing a grouping of the respective start indexes and the respective end indexes deemed to cover same respective portions of each of the plurality of media content items;
   perform an index grouping operation to identify sets of the normalized respective skip start indexes and the respective skip end indexes as falling within a predetermined threshold of each other;

generate and store a set of skip rules for the title, the set of skip rules indicating the identified sets of the normalized respective skip start indexes and the respective skip end indexes;

receive a request for playback of a new media content item associated with the title; and during playback of the new media content item, skip a portion of the new media content item in accordance with the identified sets of the normalized respective skip start indexes and the respective skip end indexes indicated by the set of skip rules.

2. The system of claim 1, wherein the instructions to receive the request for playback of the new media content item associated with the title include instructions from the user to activate a skip mode, and the instructions to skip the portion include instructions to automatically skip the portion in accordance with the instructions to activate the skip mode.

3. The system of claim 1, wherein the instructions further include instructions to read metadata of one of the frames between the skip start and skip end indexes to determine whether the metadata indicates commercial programming.

4. The system of claim 3, wherein the instructions further include instructions to assign one of the skip start indexes to a first frame at which commercial programming is indicated.

5. The system of claim 3, wherein the instructions further include instructions to assign one of the skip end indexes to the frame where the commercial programming finishes.

6. The system of claim 1, wherein the performing the index grouping operation comprises identifying the sets of the normalized respective skip start indexes and the respective skip end indexes based on a minimum number of media content items, the minimum number being greater than two.

7. The system of claim 1, wherein:
the instructions further include instructions to search for a stored skip rule associated with the title in response to receiving the request for playback of the new media content item; and
the instructions to skip the portion are in accordance with the search resulting in identifying the set of skip rules.

8. A method, comprising:
storing a plurality of media content items that are each associated with a same title, each media content item having a respective start index and a respective end index;
determining, for each of the media content items, a respective skip start index and a respective skip end index, the respective skip start index corresponding to a location in the media content item at which a first input was received by a user during prior playback of the media content item to begin skipping a portion of the media content item, and the respective skip end index corresponding to a location in the media content item at which a second input was subsequently received by the user to resume playback of the media content item;

normalizing the respective skip start indexes and the respective skip end indexes across the plurality of media content items in accordance with normalizing a grouping of the respective start indexes and the respective end indexes deemed to cover same respective portions of each of the plurality of media content items;

performing an index grouping operation to identify sets of the normalized respective skip start indexes and the respective skip end indexes as falling within a predetermined threshold of each other;

generating and store a set of skip rules for the title, the set of skip rules indicating the identified sets of the normalized respective skip start indexes and the respective skip end indexes;

receiving a request for playback of a new media content item associated with the title; and during playback of the new media content item, skipping a portion of the new media content item in accordance with the identified sets of the normalized respective skip start indexes and the respective skip end indexes indicated by the set of skip rules.

9. The method of claim 8, further comprising receiving an input from the user to activate a skip mode, wherein the skipping the portion includes automatically skipping the portion in accordance with the instructions to activate the skip mode.

10. The method of claim 8, further comprising reading metadata of a frame at the one of the skip start indexes and metadata of frames before and after the skip start index to determine whether the metadata include commercial programming metadata.

11. The method of claim 10, further comprising assigning one of the skip start indexes to a first frame at which commercial programming is indicated.

12. The method of claim 10, further comprising assigning one of the skip end indexes to the frame where the commercial programming finishes.

13. The method of claim 8, wherein the performing the index grouping operation comprises identifying the sets of the normalized respective skip start indexes and the respective skip end indexes based on a minimum number of media content items, the minimum number being greater than two.

14. The method of claim 8, further comprising:
searching for a stored skip rule associated with the title in response to receiving the request for playback of the new media content item,
wherein the skipping the portion is in accordance with the search resulting in identifying the set of skip rules.

* * * * *